United States Patent
Azuma

(10) Patent No.: US 11,211,090 B2
(45) Date of Patent: *Dec. 28, 2021

(54) MAGNETIC-DISK GLASS SUBSTRATE, MAGNETIC-DISK GLASS SUBSTRATE INTERMEDIATE, AND METHOD FOR MANUFACTURING MAGNETIC-DISK GLASS SUBSTRATE

(71) Applicant: HOYA CORPORATION, Tokyo (JP)

(72) Inventor: Shuhei Azuma, Akishima (JP)

(73) Assignee: HOYA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/884,931

(22) Filed: May 27, 2020

(65) Prior Publication Data

US 2020/0286516 A1 Sep. 10, 2020

Related U.S. Application Data

(63) Continuation of application No. 15/579,033, filed as application No. PCT/JP2016/079037 on Sep. 30, 2016, now Pat. No. 10,720,180.

(30) Foreign Application Priority Data

Sep. 30, 2015 (JP) ................................ 2015-195128

(51) Int. Cl.
*G11B 5/84* (2006.01)
*G11B 5/73* (2006.01)

(52) U.S. Cl.
CPC ........ *G11B 5/8404* (2013.01); *G11B 5/73921* (2019.05); *G11B 5/84* (2013.01)

(58) Field of Classification Search
None
See application file for complete search history.

(56) References Cited

U.S. PATENT DOCUMENTS

| 5,549,954 A | 8/1996 | Otsuka et al. |
| 6,383,404 B1 | 5/2002 | Sakai et al. |

(Continued)

FOREIGN PATENT DOCUMENTS

| CN | 101977860 A | 2/2011 |
| CN | 104584126 A | 4/2015 |

(Continued)

OTHER PUBLICATIONS

Office Action translated into Japanese in the corresponding Chinese Patent Application No. 201910743784, dated May 8, 2020.

(Continued)

*Primary Examiner* — Kevin M Bernatz
(74) *Attorney, Agent, or Firm* — Global IP Counselors, LLP

(57) ABSTRACT

A magnetic-disk glass substrate contains an alkaline earth metal component as a glass composition and includes a pair of main surfaces, and an outer circumferential side edge surface that is a mirror surface. The outer circumferential side edge surface includes a surface having a roughness percentage of 40% or more when a bearing ratio of a roughness cross-sectional area is 50% in a bearing ratio curve of roughness cross-sectional areas obtained when a surface roughness of the outer circumferential side edge surface obtained after the outer circumferential side edge surface is etched by 2.5 μm is measured.

20 Claims, 6 Drawing Sheets

(56) References Cited

U.S. PATENT DOCUMENTS

| | | |
|---|---|---|
| 6,509,111 B1 | 1/2003 | Shoda et al. |
| 6,547,980 B1 | 4/2003 | Kurachi et al. |
| 6,706,427 B2 | 3/2004 | Yokoyama et al. |
| 6,743,529 B2 | 6/2004 | Saito et al. |
| 6,852,432 B2 | 2/2005 | Shoda et al. |
| 7,662,493 B2 | 2/2010 | Machida et al. |
| 8,734,967 B2 | 5/2014 | Kitsunai et al. |
| 9,595,283 B2 | 3/2017 | Tamaki et al. |
| 9,595,284 B2 | 3/2017 | Tamaki et al. |
| 9,595,286 B2 | 3/2017 | Tamaki et al. |
| 9,697,860 B2 * | 7/2017 | Ueda .................. G11B 5/73921 |
| 10,032,472 B2 * | 7/2018 | Azuma ............. G11B 5/73921 |
| 10,720,180 B2 * | 7/2020 | Azuma ................ G11B 5/8404 |
| 2001/0053444 A1 * | 12/2001 | Yokoyama ........... G11B 5/8404 428/410 |
| 2002/0142191 A1 | 10/2002 | Sakai et al. |
| 2002/0197437 A1 | 12/2002 | Hashimoto et al. |
| 2003/0215672 A1 * | 11/2003 | Shoda .................... G11B 5/737 428/831.2 |
| 2005/0052987 A1 * | 3/2005 | Sonoda .................... G11B 5/64 369/283 |
| 2007/0178281 A1 | 8/2007 | Nakamura et al. |
| 2007/0196699 A1 * | 8/2007 | Aida ....................... B24B 9/065 428/846.1 |
| 2008/0028793 A1 * | 2/2008 | Aida ....................... C03C 19/00 65/61 |
| 2008/0224270 A1 * | 9/2008 | Ikubo .................. H01L 21/0206 257/618 |
| 2009/0226767 A1 * | 9/2009 | Fukushima ............ G11B 5/667 428/848.2 |
| 2011/0086241 A1 | 4/2011 | Hachitani et al. |
| 2011/0123834 A1 | 5/2011 | Hoshino et al. |
| 2014/0329174 A1 | 11/2014 | Hamamoto et al. |
| 2015/0255103 A1 | 9/2015 | Ueda |
| 2016/0372147 A1 | 12/2016 | Azuma |
| 2018/0301164 A1 * | 10/2018 | Azuma ................... B24B 1/005 |

FOREIGN PATENT DOCUMENTS

| | | |
|---|---|---|
| CN | 106030709 A | 10/2016 |
| JP | H07-244947 A | 9/1995 |
| JP | 2000-132829 A | 5/2000 |
| JP | 2007-042263 A | 2/2007 |
| JP | 2007-272995 A | 10/2007 |
| JP | 2012-142084 A | 7/2012 |
| WO | 2014050241 A1 | 4/2014 |
| WO | 2015/152316 A1 | 4/2017 |

OTHER PUBLICATIONS

International Search Report in PCT/JP2016/079037 dated Dec. 13, 2016.

Office Action translated into Japanese in the corresponding Chinese Patent Application No. 201680029894.4, dated Dec. 5, 2018.

* cited by examiner

Deepest valley portion

MAGNETIC-DISK GLASS SUBSTRATE, MAGNETIC-DISK GLASS SUBSTRATE INTERMEDIATE, AND METHOD FOR MANUFACTURING MAGNETIC-DISK GLASS SUBSTRATE

CROSS-REFERENCE TO RELATED APPLICATIONS

This is a continuation application of U.S. patent application Ser. No. 15/579,033, filed on Dec. 1, 2017, which is a U.S. National Stage Application of International Application No. PCT/JP2016/079037, filed on Sep. 30, 2016 which, in turn, claims priority to Japanese Patent Application No. 2015-195128, filed in Japan on Sep. 30, 2015. The entire contents of U.S. patent application Ser. No. 15/579,033, International Application No. PCT/JP2016/079037, and Japanese Patent Application No. 2015-195128 are hereby incorporated herein by reference.

BACKGROUND

Field of the Invention

The present invention relates to a magnetic-disk glass substrate, a magnetic disk, and a glass substrate intermediate that serves as the blank for the magnetic-disk glass substrate.

Background Information

Nowadays, in order to record data, hard disk drives are incorporated in personal computers, laptop computers, DVD (digital versatile disc) recording apparatuses, and the like. In particular, a magnetic disk obtained by providing a magnetic film (also referred to as "magnetic layer" hereinafter) on a non-magnetic substrate for a magnetic disk is used in a hard disk drive used in a device for which portability is a prerequisite, such as a laptop personal computer. A glass substrate is used as a magnetic-disk substrate, for example.

In order to meet the demand for an increase in the recording density and an increase in the storage capacity of magnetic disks, DFH (dynamic flying height)-type magnetic heads (referred to as DFH heads, hereinafter) have been developed in which, due to allowing only a recording and reproduction element (at least one of a recording element and a reproduction element) to protrude toward the medium surface, a distance between the magnetic disk surface and the recording and reproduction element (also referred to as a flying height, hereinafter) is shorter than in a conventional magnetic disk, and a flying height of about 5 nm is achieved, for example.

In such DFH heads, the above-described flying height is short, and thus it is necessary to avoid attachment of minute particles and the like to main surfaces of magnetic disks. In order to suppress the attachment of these minute particles, it is desirable that not only main surfaces but also edge surfaces of the glass substrate are polished with high precision, so that defects such as minute recesses and the like are not formed.

Usually, the edge surface of a glass substrate includes a side wall surface of the glass substrate and chamfered surfaces provided between this side wall surface and the main surfaces. In this glass substrate, a glass substrate that has no recessed pit defects on chamfered surfaces is known (JP 2012-142084A).

The glass substrate is obtained by performing edge surface polishing using a polishing brush after chamfering processing is performed with a grindstone to which diamond abrasive particles are fixed, and is a glass substrate having five or less pit defects/mm$^2$, the pit defects having a diameter or a major length of 10 μm or more that are observed after the surface of the chamfered surfaces of the glass substrate are etched by 5 μm.

SUMMARY

The above-described DFH head is provided with a heater for controlling the above-described flying height with thermal expansion resulting from heat provided to a recording and reproduction element, and recently, in order to further reduce the flying height, a HDI (head disk interface) sensor has been mounted on the DFH head as a functional element for controlling the flying height with high precision. In this DFH head, a protrusion amount of at least one of a recording element and a reproduction element is controlled based on a signal from the HDI sensor. Even in the case where the distance between the recording and reproduction element and the magnetic disk is made extremely small, or for example, 1 nm or less, by the DFH head mounted with the HDI sensor, for the first time, it has become possible to perform stable recording and reproduction over a long period of time.

When a long-term medium durability test was performed under the flying conditions that the flying height of the recording and reproduction element of the DFH head was 1 nm, 5 nm, and 10 nm using such a DFH head and a magnetic disk that was produced from a glass substrate that had no pit defects described above, under the flying condition that the flying height was 1 nm, a phenomenon in which the SN ratio of a reproduction signal decreased was confirmed. A decrease in the above-described SN ratio was not observed under the conventional flying conditions that the flying heights were 5 nm and 10 nm.

Thus, it is conceivable that under the flying condition that the flying height was 1 nm or less, the SN ratio of the reproduction signal decreased due to a phenomenon to which there was no need to give consideration before.

In view of this, an object of the present invention is to provide a magnetic-disk glass substrate, a magnetic disk, and a glass substrate intermediate that do not hinder the recording and reproduction of the magnetic disk, and a method for manufacturing a magnetic-disk glass substrate.

An aspect of the present invention is a magnetic-disk glass substrate containing an alkaline earth metal component as a glass composition. This magnetic-disk glass substrate is a magnetic-disk glass substrate containing an alkaline earth metal component as the glass composition. The magnetic-disk glass substrate comprises a pair of main surfaces and an outer circumferential side edge surface that is a mirror surface. The outer circumferential side edge surface includes a surface having a roughness percentage of 40% or more when a bearing ratio of a roughness cross-sectional area is 50% in a bearing ratio curve of roughness cross-sectional areas obtained when a surface roughness of the outer circumferential side edge surface obtained after the outer circumferential side edge surface is etched by 2.5 μm is measured.

It is preferable that the roughness percentage is 50% or more.

It is preferable that the roughness percentage is 60% or less.

It is preferable that an arithmetic average surface roughness of the mirror surface is 0.015 μm or less.

It is preferable that a glass transition point of the glass composition that constitutes the magnetic-disk glass substrate is 600° C. or more.

It is preferable that a glass transition point of the glass composition that constitutes the magnetic-disk glass substrate is 700° C. or more.

It is preferable that the glass composition that constitutes the magnetic-disk glass substrate is alkali-free glass.

It is preferable that an arithmetic average roughness Ra of the main surfaces of the magnetic-disk glass substrate is 0.15 nm or less.

Also, yet another aspect of the present invention is a glass substrate intermediate containing an alkaline earth metal component as a glass composition and serving as a blank for a magnetic-disk glass substrate. The glass substrate intermediate comprises a pair of main surfaces, and an outer circumferential side edge surface that is a mirror surface, and the outer circumferential side edge surface includes a surface having a roughness percentage of 40% or more when a bearing ratio of a roughness cross-sectional area is 50% in a bearing ratio curve of roughness cross-sectional areas obtained when a surface roughness of the outer circumferential side edge surface obtained after the outer circumferential side edge surface is etched by 2.5 μm is measured.

It is preferable that the roughness percentage is 50% or more.

It is preferable that a glass transition point of the glass composition that constitutes the glass substrate intermediate is 700° C. or more.

It is preferable that the glass composition that constitutes the glass substrate intermediate is alkali-free glass.

It is preferable that an arithmetic average surface roughness of the mirror surface is 0.015 μm or less.

Moreover, still another aspect of the present invention is a method for manufacturing a magnetic-disk glass substrate in which at least polishing processing for is performed on the main surfaces of the glass substrate intermediate.

Still another aspect of the present invention is a magnetic disk. A surface of the magnetic-disk glass substrate has at least a magnetic film.

Still another aspect of the present invention is a hard disk drive that comprises at least the magnetic disk.

According the above-described magnetic-disk glass substrate, magnetic-disk glass substrate intermediate, and method for manufacturing a magnetic-disk glass substrate, it is possible to suppress the occurrence of corrosion on an edge surface of a glass substrate. As a result, even under the flying condition that the flying height of a recording and reproduction element is smaller than in the conventional recording and reproduction element, the recording and reproduction of a magnetic disk is not hindered and a decrease in the SN ratio of a reproduction signal can be suppressed.

DESCRIPTION OF EMBODIMENTS

Figure 1:
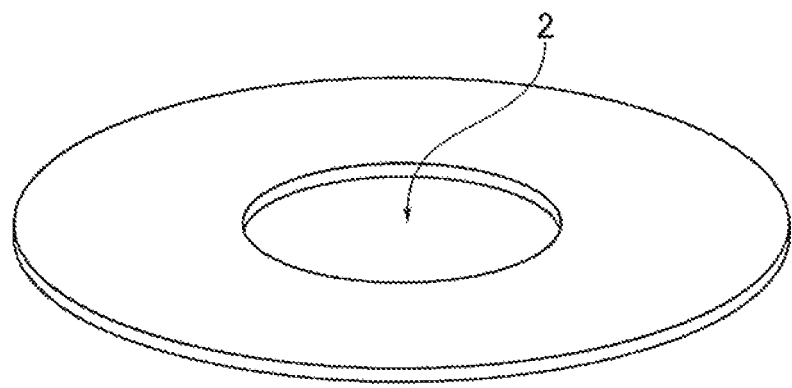
FIG. 1 is a diagram showing the external shape of a magnetic-disk glass substrate of this embodiment.

Hereinafter, a magnetic-disk glass substrate, a magnetic disk, a glass substrate intermediate, and a method for manufacturing a magnetic-disk glass substrate according to the present invention will be described in detail.

Upon conducting research and examination on a glass substrate in which the SN ratio of a reproduction signal decreases under the flying condition that the flying height of a recording and reproduction element of a magnetic head is 1 nm or less, an inventor of this invention found that a substance caused by corrosion (elution of glass components) that conventionally would not occur if the edge surface of the glass substrate was polished into a mirror surface was formed on the edge surface. It is conceivable that this corrosion-derived substance moved to the main surfaces and attached to the recording and reproduction element. That is, it is thought that even if the edge surface of the glass substrate is finished into a mirror surface, the surface of the edge surface is damaged by heat shock or the like during film formation processing when a magnetic disk is manufactured, a latent crack formed in shape processing or edge surface polishing widens, the crack becomes apparent, and corrosion occurs in which a portion of the glass components, for example, an alkaline earth metal component such as magnesium or calcium, is eluted from this apparent crack. The eluted alkaline earth metal components react with carbon dioxide in the air and produce carbonates such as magnesium carbonate or calcium carbonate in some cases. In particular, in a glass substrate used for a magnetic disk for an energy-assisted magnetic recording method such as HAMR (heat assisted magnetic recording) with which information is recorded by locally heating the magnetic disk using a laser beam or the like, annealing processing needs to be performed at a temperature of 500 to 700° C., for example, after a magnetic layer is formed, and thus the occurrence of corrosion needs to be suppressed more significantly.

In order to suppress the occurrence of this corrosion, as a result of intensive studies on the surface shapes of an edge surface of a glass substrate and the occurrence of corrosion, the inventor of this invention achieved the following techniques.

An arithmetic average roughness Ra and a maximum height Rz referred to in this specification are values conforming to JIS B0601:2001.

Measurement of a surface shape of an edge surface of a glass substrate, which is performed in order to obtain a bearing ratio of a roughness cross-sectional area, an arithmetic average roughness Ra, and a maximum height Rz is performed under the following conditions in a 50×50 µm square evaluation region using a laser microscope.

Observation magnification: 3000-fold,
Measurement pitch in height direction (Z axis): 0.01 µm,
Cutoff value λs: 0.25 µm, and
Cutoff value λc: 80 µm.

Note that the resolution in the height direction is preferably 1 nm or less. Also, although the observation magnification is 3000-fold in the present embodiment, the observation magnification is selected in a range of 1000 to 3000-fold as appropriate in accordance with the size of the measurement surface.

Magnetic Disk

A magnetic disk has a donut shape obtained by concentrically hollowing out the central portion of a disk shape and rotates about the center of the ring. The magnetic disk includes a glass substrate and at least a magnetic layer (magnetic film). Note that in addition to the magnetic layer, an adherent layer, a soft magnetic layer, a nonmagnetic base layer, a vertical magnetic recording layer, a protecting layer, a lubricant layer, and the like are formed, for example. A Cr alloy or the like is used as the adherent layer, for example. The adherent layer functions as a layer for affixing the glass substrate. A CoTaZr alloy or the like is used as the soft magnetic layer, for example. A granular nonmagnetic layer or the like is used as the nonmagnetic base layer, for example. A granular magnetic layer or the like is used as the vertical magnetic recording layer, for example. A material made of hydrogen carbon is used as the protecting layer. A fluorine-based resin or the like is used as the lubricant layer, for example.

The magnetic disk is obtained by successively forming, on both main surfaces of a glass substrate, a CrTi adherent layer, a CoTaZr/Ru/CoTaZr soft magnetic layer, a CoCrSiO$_2$ nonmagnetic granular base layer, a CoCrPt-SiO$_2$.TiO$_2$ granular magnetic layer, and a hydrogenated carbon protecting film, using an inline sputtering apparatus, for example. Furthermore, a perfluoropolyether lubricant layer is formed with a dipping method on the outermost layer that was formed.

Aluminosilicate glass, soda-lime glass, borosilicate glass, and the like can be used as a material for the magnetic-disk glass substrate in the present embodiment. In particular, amorphous aluminosilicate glass can be suitably used in light of the fact that the flatness, waviness, and roughness of main surfaces can be easily reduced and a magnetic-disk glass substrate that is excellent in substrate strength can be produced. Also, aluminosilicate glass is preferable because chemical strengthening can be carried out.

Glass Composition 1

Although there is no limitation on the composition of the glass substrate of the present embodiment, the glass substrate of the present embodiment is preferably amorphous aluminosilicate glass having an alkali-free glass composition including, in terms of oxide amount in mass %, SiO$_2$ in an amount of 40 to 61%, Al$_2$O$_3$ in an amount of 15% to 23.5%, MgO in an amount of 2 to 20%, and CaO in an amount of 0.1 to 40%, with [SiO$_2$]+0.43×[Al$_2$O$_3$]+0.59× [CaO]−74.6≤0 and [SiO$_2$]+0.21×[MgO]+1.16∴[CaO]− 83.0≤0 being satisfied. The above-described brackets ([ ]) indicate the content (mass %) of a glass component shown in the brackets. Hereinafter, the above composition is also referred to as Glass Composition 1.

Glass Composition 2

Also, the following composition is an example of another preferred glass composition. That is, the example is amorphous aluminosilicate glass having a glass composition including, in terms of oxide amount in mass %, SiO$_2$ in an amount of 64 to 72%, Al$_2$O$_3$ in an amount of 17 to 22%, MgO in an amount of 1 to 8%, and CaO in an amount of 4 to 15.5%, with 0.20≤[MgO]/([MgO]+[CaO])≤0.41 being satisfied.

The glass substrate of the present embodiment contains any of alkaline earth metal components such as MgO, CaO, and SrO as essential components of the glass composition. Note that the glass substrate may contain alkali metal components (Li$_2$O, Na$_2$O, and K$_2$O), but the content thereof is preferably small if the Tg needs to be high, and the glass substrate more preferably does not contain the alkali metal components. Also, when glass contains alkali metal components, there is a concern that the alkali metal components will sometimes elute depending on the glass composition, but the elution risk can be reduced by reducing the content of the alkali metals or making the content thereof zero (alkali-free glass).

Note that in order to cope with heat treatment when a magnetic film is formed, it is preferable to adjust the glass composition such that the glass transition point (Tg) is 600° C. or more. The glass transition point is more preferably 700° C. or more and even more preferably 750° C. In particular, when the glass transition point is 700° C. or more, the glass substrate can bear heat treatment in the entire temperature range of 500 to 700° C. described above, and thus the glass transition point is preferably 700° C. or more. Such a glass substrate is suitable as the glass substrate that is used for a magnetic disk for an energy-assisted magnetic recording method.

Magnetic-Disk Glass Substrate

Figure 2:
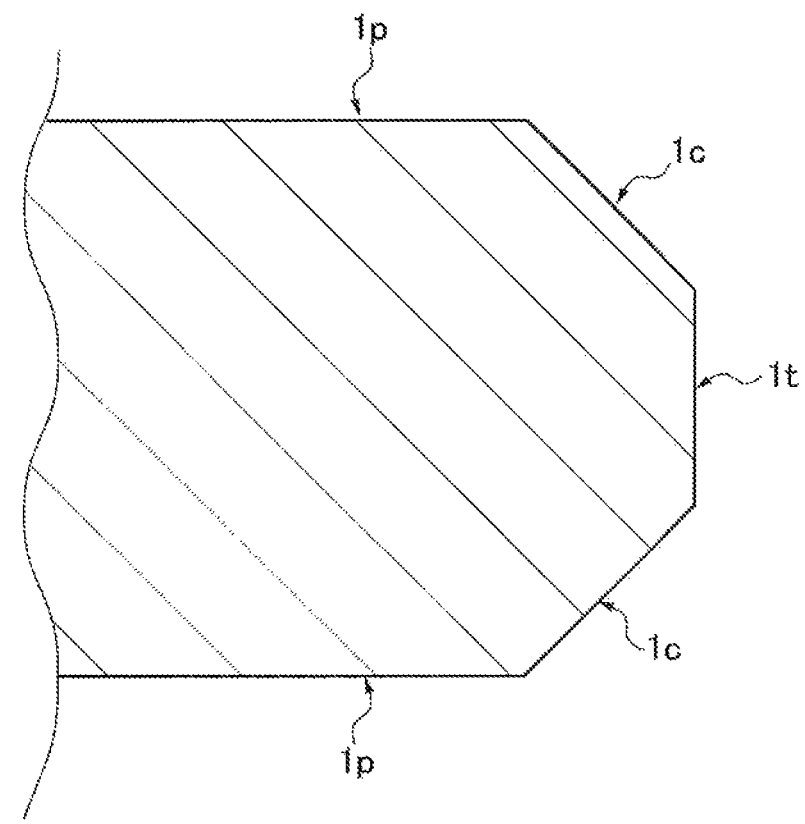
FIG. 2 is an enlarged cross-sectional view of an edge surface of a magnetic-disk glass substrate of this embodiment.

FIG. 1 is a diagram showing the external shape of a magnetic-disk glass substrate of the present embodiment. FIG. 2 is an enlarged cross-sectional view of an outer circumferential side edge surface of a magnetic-disk glass substrate.

As shown in FIG. 1, a magnetic-disk glass substrate in the present embodiment is a donut-shaped thin glass substrate in which an inner hole 2 is formed. There is no limitation on the size (diameter) of the glass substrate. The glass substrate can be used as a substrate having a nominal size of 1.8 to 3.5 inches, for example. There is also no particular limitation on the substrate thickness, and it may be 0.3 to 3 mm, for example.

As shown in FIG. 2, the glass substrate of the present embodiment has a pair of main surfaces 1p, a side wall surface 1t of the glass substrate that extends orthogonally to the pair of main surfaces 1p, and chamfered surfaces 1c that are provided between the side wall surface 1t and the main surfaces 1p, extend from the side wall surfaces 1t with inclination with respect to the side wall surfaces 1t, and are connected to the main surfaces 1p. Although not shown, a side wall surface and chamfered surfaces are formed similarly to an inner circumferential side edge surface of the glass substrate. Note that the chamfered surfaces may be partially or entirely formed into an arcuate shape in cross-sectional view.

The glass substrate of the present embodiment has a shape that meets the following two requirements, namely, Requirement 1 and Requirement 2, with regard to the surface shape of at least one of the side wall surface and the chamfered surfaces.

(Requirement 1): the edge surface of the glass substrate is a mirror surface, (Requirement 2): the glass substrate includes an edge surface having a roughness percentage of 40% or more when a bearing ratio of a roughness cross-sectional area is 50% in a bearing ratio curve of roughness cross-sectional areas obtained when a surface roughness of the edge surface obtained after the edge surface is wet-etched by 2.5 μm is measured.

The edge surface of the glass substrate being a mirror surface in Requirement 1 indicates that the edge surface of the glass substrate is a surface that has undergone polishing processing, reflects an image of an object, and reflects the image on the surface as a mirror. It is preferable that the mirror surface is such that an arithmetic average roughness Ra, which is the surface roughness of the edge surface, is 0.015 μm or less, for example. If the arithmetic average roughness Ra of the edge surface is greater than 0.015 μm, foreign matter (minute particles) easily attaches thereto due to foreign matter being captured by a recessed portion on the surface. Also, it is preferable that a maximum height Rz, which is the surface roughness of the edge surface, is 0.15 μm or less. Because the depths of grooves that are in the form of stripes occurring on the edge surface are reduced by setting the maximum height Rz to 0.15 μm or less, minute particles of colloidal silica or the like used in polishing are unlikely to attach to (remain on) the surface.

The arithmetic average roughness Ra is more preferably 0.015 μm or less, and the maximum height Rz is preferably 0.15 μm or less.

Figure 3:
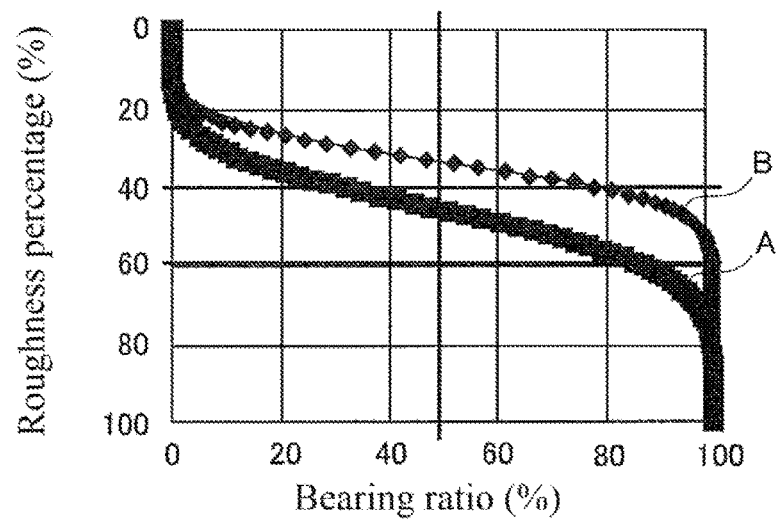
FIG. 3 is a diagram illustrating a bearing ratio curve of roughness cross-sectional areas of a glass substrate.

The roughness percentage (roughness percentage when the bearing ratio of the roughness cross sectional area is 50%) of Requirement 2 can be obtained from the bearing ratio curve of the roughness cross-sectional areas of the edge surface (the side wall surface and/or the chamfered surfaces) described below. FIG. 3 is a diagram illustrating the bearing ratio curve of the roughness cross-sectional areas of the side wall surface and/or the chamfered surface. Note that the bearing ratio curve of the roughness cross-sectional areas is also referred to as a bearing curve.

Figure 4:
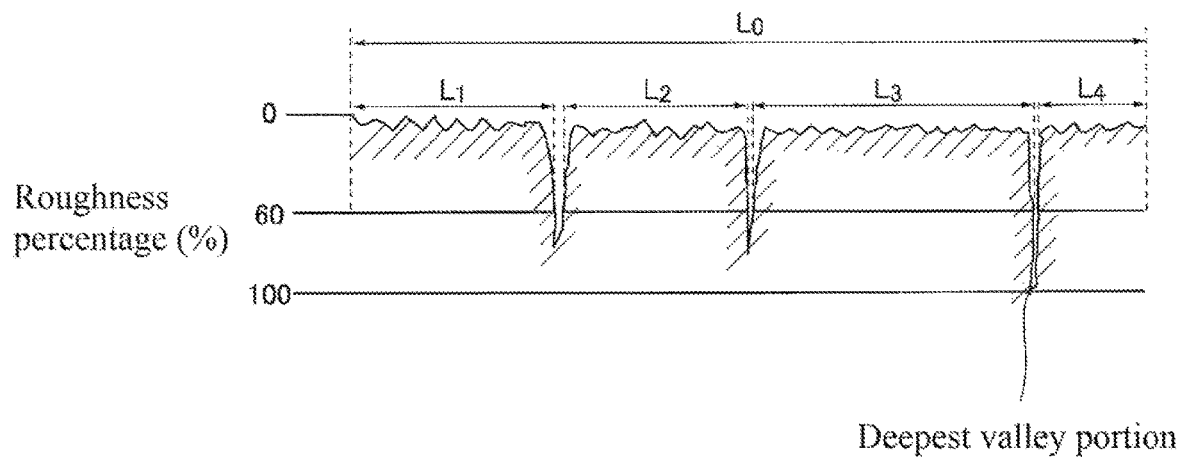
FIG. 4 is a diagram illustrating a bearing ratio of a roughness cross-sectional area (cross-sectional length).

Here, the "roughness percentage" indicates a value obtained by expressing the level of a cutting height in percentage, when it is envisioned that, in the results of measurement of the surface shape of a surface vicinity region of a target object (or data on measurement of the surface shape), the surface vicinity region of the object is cut by a plane parallel to a surface that defines a macroscopic shape of the surface at a given height, the level of a cutting height (cutting level) at which the cut plane comes into contact with the maximum protruding portion that protrudes the most in the surface vicinity region being set to a maximum height 0%, and the level of a cutting height (cutting level) at which the cutting plane is in contact with the deepest valley portion that recesses the most in the surface vicinity region of the glass substrate being set to a minimum height 100%. The "bearing ratio of the roughness cross-sectional area" indicates a value obtained by expressing, in percentage, the ratio of an area of a cutting plane that cuts the surface vicinity region at a specific cutting level, with respect to the area of a portion in which the surface vicinity region of the object is present on the cutting plane (that is, the area of the surface vicinity region of the object viewed in a direction orthogonal to the cutting plane, but not the area of a surface extending along the unevenness of the surface). In the example of the one-dimensional surface shape shown in FIG. 4, the "bearing ratio of the roughness cross-sectional area" indicates a value, which is expressed in percentage, of a ratio of a total length $(L_1+L_2+L_3+L_4)$ of lengths $L_1$, $L_2$, $L_3$, and $L_4$ of a region that cuts the surface vicinity region of the object, with respect to a cut length $L_0$. FIG. 4 is a diagram illustrating the bearing ratio of the roughness cross-sectional area.

The "bearing ratio curve of the roughness cross-sectional areas" is a curve that expresses a relationship between the roughness percentage and the bearing ratio of the roughness cross-sectional area where the vertical axis is the axis for the roughness percentage and the horizontal axis is the axis for the bearing ratio of the roughness cross-sectional area.

FIGS. 5A to 5D are diagrams showing waveforms c to f of a plurality of one-dimensional surface shapes and bearing ratio curves C to F of roughness cross-sectional lengths obtained at this time. Because the bearing ratio curves of one-dimensional waveforms are obtained, the bearing ratio curves of the roughness cross-sectional lengths are shown in the examples shown in FIGS. 5A to 5D, but the bearing ratio curves obtained by checking the roughness cross-sectional areas are shown in the example shown in FIG. 3.

Figure 5A:
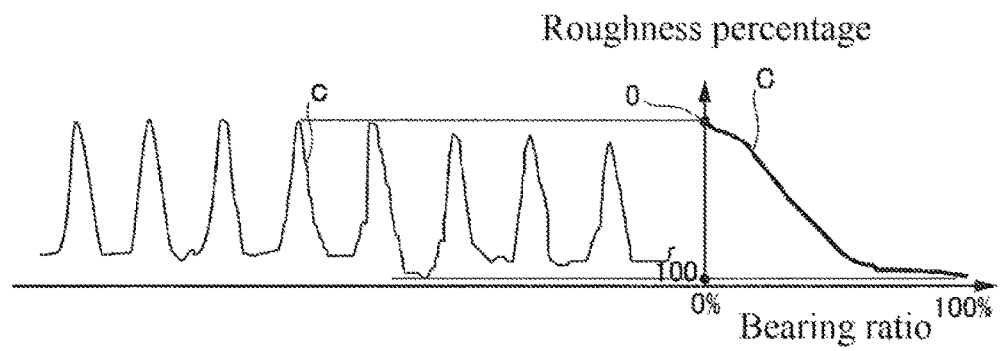
FIGS. 5A to 5D are diagrams showing waveforms of various one-dimensional surface shapes and a bearing ratio curve of roughness cross-sectional lengths obtained from each waveform.
Figure 5B:
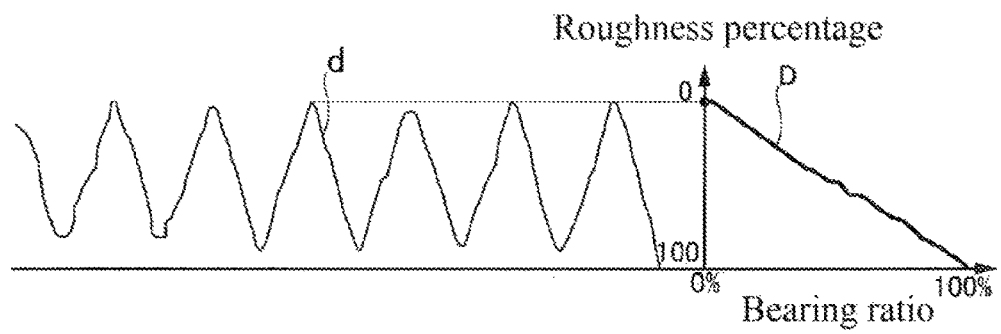
Figure 5C:
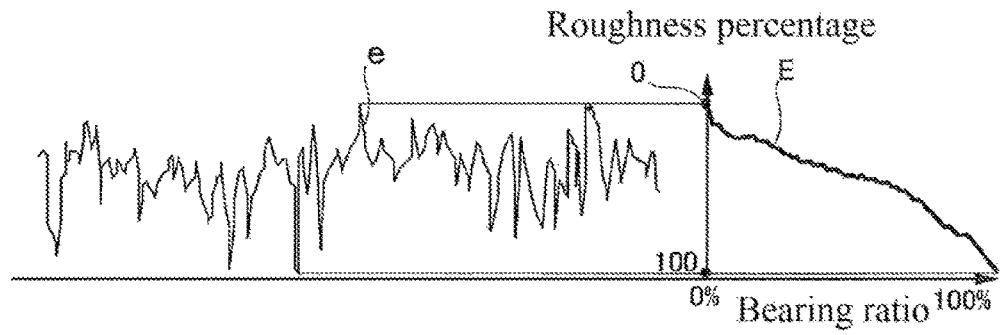
Figure 5D:
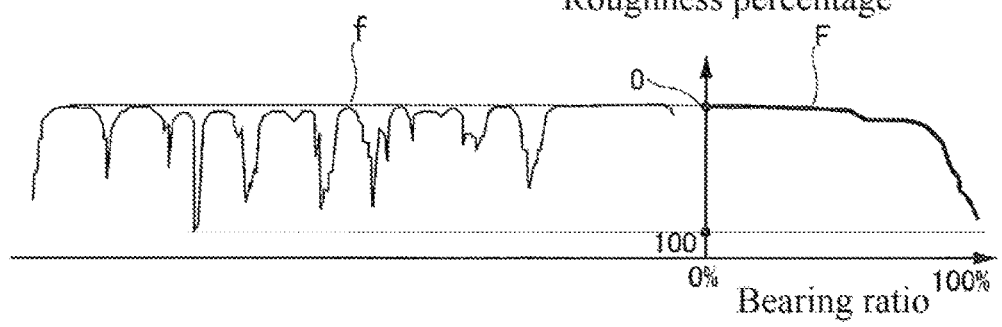

As shown in FIG. 5A, in the case of waveform c in which protruding portions protrude at a distance from each other from a surface having an approximately constant level, bearing ratio curve C is a curve in which the bearing ratio gradually increases (advances in the rightward direction of the horizontal axis in FIG. 5A) when the roughness percentage advances from 0% to 100% (advances in the downward direction of the vertical axis in FIG. 5A). In contrast, as shown in FIG. 5D, in the case of waveform f in which recessed portions such as cracks advance at a distance from each other from the surface having an approximately constant level to the inner portion, bearing ratio curve F is a curve in which the bearing ratio suddenly increases (advances in the rightward direction of the horizontal axis in FIG. 5D) when the roughness percentage advances from 0% to 100% (advances in the downward direction of the vertical axis in FIG. 5D). As shown in FIG. 5B, in the case of the one-dimensional waveform d in which protruding portions and recessed portions appear at approximately the same ratio, bearing ratio curve D is a curve in which when the roughness percentage advances from 0% to 100% (advances in the downward direction of the vertical axis in FIG. 5B), the slope of an increase in the bearing ratio (the rightward direction of the horizontal axis in FIG. 5B) is approximately constant, and the slope is an intermediate value between the slope of bearing ratio curve C and the slope of bearing ratio curve F. Therefore, the type of the surface shape can be understood from the bearing ratio curve.

Regarding Requirement 2 above, first, a bearing ratio curve of the surface shape relating to the edge surface obtained by wet-etching the edge surface of the glass substrate by 2.5 μm is obtained. Data on this surface shape is obtained by measuring the surface shape relating to the edge surface that has undergone wet-etching. At this time, on the edge surface of the glass substrate of the present embodiment that has undergone wet-etching, the roughness percentage when the bearing ratio of the roughness cross-sectional area is 50% is 40% or more. Preferably, the roughness percentage is 50% or more when the bearing ratio of the roughness cross sectional area is 50%. In this manner, the edge surface of the glass substrate of the present embodiment has a surface shape in which the roughness percentage is 40% or more when the edge surface of the glass substrate has undergone wet-etching.

The reason why the surface shape of the edge surface of the glass substrate is defined using the roughness percentage of the surface shape of the edge surface that has undergone wet-etching is so that at the time of shape processing for forming the side wall surface 1t and the chamfered surfaces 1c (see FIG. 2), a latent crack is formed in the vicinity of the surface of the edge surface of the glass substrate, a gap of this latent crack widens due to wet-etching, and the latent crack becomes apparent. That is, multiple latent cracks that are not apparent unless wet-etched are formed on the edge surface of the glass substrate that has undergone the edge surface polishing processing, these latent cracks are made apparent with wet-etching, and the bearing ratio curve of the surface shape of the edge surface that has undergone wet-etching is obtained in order to evaluate the edge surface.

With the glass substrate of the present embodiment, the roughness percentage when the bearing ratio of the roughness cross-sectional area of the surface shape of the edge surface that has undergone wet-etching is 50% is 40% or more. This indicates that the edge surface that has undergone wet-etching does not have a surface shape as shown in FIG. 5D, but has a surface shape as shown in FIG. 5B. That is, it indicates that the edge surface does not have the surface shape in which recessed portions such as cracks as shown in FIG. 5D advance in the inner portion. The reason why the surface shape of the edge surface is defined with a roughness percentage when the bearing ratio of the roughness cross-sectional area is 50% is because the shape of the bearing ratio curve can be known with this percentage, and the surface shape of the edge surface that has undergone wet-etching can be precisely known.

Regarding the bearing ratio curve of the surface shape of the edge surface shown in FIG. 3, the roughness percentage when the bearing ratio of the roughness cross-sectional area is 50% is 40% or more in bearing ratio curve A, and the roughness percentage when the bearing ratio of the roughness cross-sectional area is 50% is less than 40% in bearing ratio curve B. Thus, the surface shape of the edge surface showing bearing curve A is close to the surface shape in which recessed portions and protruding portions are included in approximately the same ratio as shown in FIG. 5B, and the surface shape showing bearing curve B is close to the surface shape in which recessed portions such as cracks advance at a distance from each other from an approximately constant surface level, as shown in FIGS. 5C and 5D.

That is, Requirement 2 means that even if the edge surface is wet-etched, there are few apparent latent cracks. Therefore, with a glass substrate that meets Requirement 1 and Requirement 2, minute particles are unlikely to attach to its edge surface, and because the glass substrate has few latent cracks, even if the latent cracks widen and become apparent due to heat shock or the like in film formation processing at the time of production of a magnetic disk, there will be few apparent cracks. Thus, the occurrence of corrosion on the glass substrate is suppressed. That is, with the glass substrate of the present embodiment, recording and reproduction are unlikely to be hindered under the flying condition of a recording element or a reproduction element in which the flying height is 1 nm or less, and a decrease in the SN ratio of a signal can be suppressed.

If the glass substrate contains alkaline earth metal components, the alkaline earth metal components are easily eluted from the surface of the glass substrate. Even in the case of a glass substrate constituted by alkaline earth-containing glass containing such alkaline earth metal components, the glass substrate of the present embodiment has few latent cracks, and thus the occurrence of corrosion can be suppressed.

In this manner, the edge surface of the present embodiment is a mirror surface, and the edge surface has a surface shape in which a roughness percentage is 40% or more when a bearing ratio of the roughness cross-sectional area is 50% in a bearing ratio curve of the roughness cross-sectional areas of the edge surface that was wet-etched. The edge surface including such a surface shape is realized by adjusting processing conditions with later-described shape processing and edge surface polishing processing using magnetic functional fluid in a method for manufacturing a glass substrate that will be described later. In edge surface polishing processing with the conventional polishing brush or polishing pads, the edge surface can be formed into a mirror surface in the edge surface polishing processing for polishing the edge surface by bringing the polishing brush or polishing pads into contact with the edge surface, but latent cracks easily form in the vicinity of the surface, and thus Requirement 2 is not met. In edge surface polishing processing using magnetic functional fluid, the magnetic functional fluid hardens due to magnetism. However, compared to the polishing brush or polishing pads, the magnetic functional fluid flexibly deforms in accordance with the cross-sectional shape of the side wall surface 1t and the chamfered surfaces 1c of the glass substrate, and thus stripe-shaped grooves or latent cracks are unlikely to form on the surfaces of the side wall surface 1t or the chamfered surfaces 1c. A slurry obtained by including polishing abrasive particles in magnetorheological fluid is favorably used as the magnetic functional fluid.

Note that it is preferable that the roughness percentage after etching is 60% or less. If the roughness percentage after etching is greater than 60%, the surface shape of the edge surface is closer to the surface shape as indicated by waveform c shown in FIG. 5A, and blemishes easily occur on the surface. Although the cause for this is not necessarily clear, if the roughness percentage after etching is greater than 60%, it is inferred that the edge surface of the glass substrate before etching is likely to be damaged by corrosion due to a wire region of its surface being etched or scratched. Therefore, it is inferred that if main surfaces are polished after the edge surface is polished while the glass substrate is held by a carrier, or if an outer circumferential edge surface of a magnetic-disk glass substrate is held by claw-like jigs, blemishes easily occur on the edge surface.

In general, in the step of forming a film such as a magnetic film, the side wall surface 1t comes into contact with a claw-like holding jig, whereas the chamfered surfaces 1c do not come into contact with the holding jig, and therefore the side wall surface 1t is easily damaged compared to the chamfered surface 1c. Thus, in particular, the side wall surface 1t preferably has a surface shape that meets Requirement 2. Note that the side wall surface 1t is also damaged in some cases due to contact with a carrier in the step of grinding or polishing a main surface.

Moreover, it is more preferable that the side wall surface 1t and chamfered surfaces 1c of the glass substrate have a surface shape that satisfy Requirement 2. Accordingly, the occurrence of corrosion on the side wall surface 1t and the chamfered surfaces 1c of the glass substrate is suppressed.

In general, the chamfered surfaces 1c do not come into contact with the claw-like holding jig, the carriers, or the like in the step of forming a film such as a magnetic film or the step of grinding or polishing a main surface, and thus are unlikely to be damaged compared to the side wall surface 1t, but the chamfered surfaces 1c are closer to the main surfaces than the side wall surface 1t, and thus when corrosion occurs, it tends to move to the main surfaces. Therefore, due to the side wall surface 1t and the chamfered surfaces 1c meeting Requirements 1 and 2, the occurrence of corrosion on the main surfaces can be suppressed well.

Portions at which the side wall surface 1t and the chamfered surfaces 1c of the glass substrate connect may have a round shape due to shape processing or edge surface polishing processing in some cases. In this case, when a measurement point is provided every 30 degrees in the circumferential direction reference on the center of the glass substrate, and a radius of curvature of a cross-sectional shape of a portion at which the side wall surface 1t and a chamfered surface 1c connect to each other is obtained at a measurement point, a difference in the radius of curvature between adjacent measurement points is preferably 0.01 mm or less. Accordingly, variation in edge surface shape on the circumference can be suppressed. Note that if this value is greater than 0.01 mm, there are cases where fluttering problems will arise after the glass substrate is incorporated into a HDD.

Note that a radius of curvature R of a portion at which the side wall surface 1t and the chamfered surface 1c are connected to each other can be obtained as follows.

Figure 6:
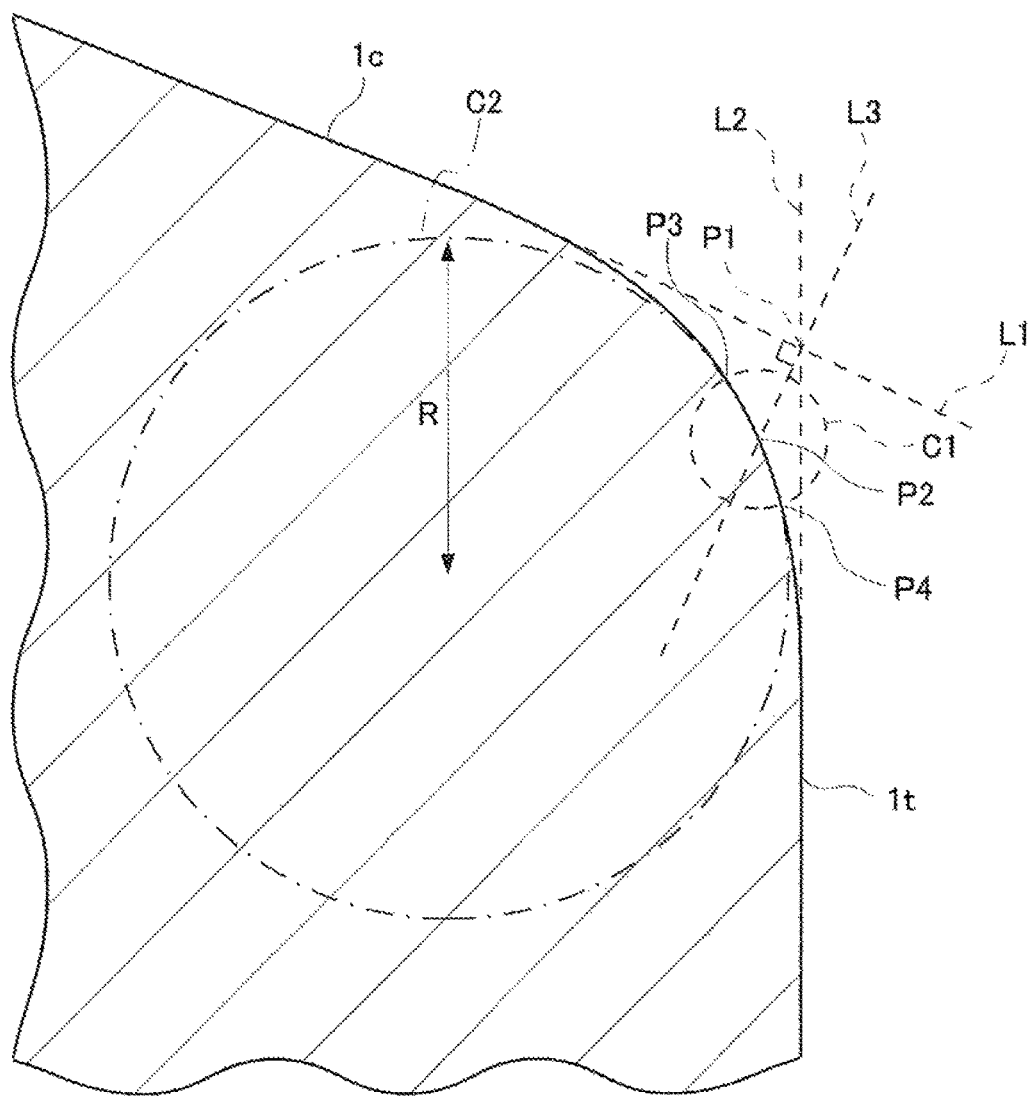
FIG. 6 is a diagram illustrating a method for obtaining a radius of curvature of a cross-sectional shape of a portion at which a side wall surface and a chamfered surface of the glass substrate of this embodiment are connected to each other.

FIG. 6 is a diagram illustrating a method for obtaining a radius of curvature of a cross-sectional shape of the portion at which the side wall surface 1t and the chamfered surface 1c are connected to each other. In FIG. 6, R indicates a radius of a circle C2 that forms the curvature of a cross-sectional shape of the portion at which the side wall surface 1t and the chamfered surface 1c are connected to each other, and indicates the radius of curvature of the shape of this connection portion. First, an intersection point of a virtual line L1 obtained by extending a linear portion of the chamfered surface 1c and a virtual line L2 obtained by extending a linear portion of the side wall surface 1t is given as P1. Next, a virtual line L3 passing through the intersection point P1 and extending orthogonally to the linear portion of the chamfered surface 1c is set. Next, an intersection point of the virtual line L3 and the portion at which the side wall surface 1t and the chamfered surface 1c are connected to each other is given as P2. Next, a circle C1 having a predetermined radius (50 μm, for example) about the intersection point P2 is set on the cross-section of the glass substrate. Next, two intersection points of an outer circumference of the circle C1 and the portion at which the side wall surface 1t and the chamfered surface 1c are connected to each other are respectively given as P3 and P4. Furthermore, a circle C2 respectively passing through three intersection points P2, P3, and P4 is set. By obtaining the radius R of the circle C2 in this manner, the radius of curvature R of the cross-sectional shape of the portion at which the side wall surface 1t and the chamfered surface 1c are connected to each other can be obtained.

Figure 7:
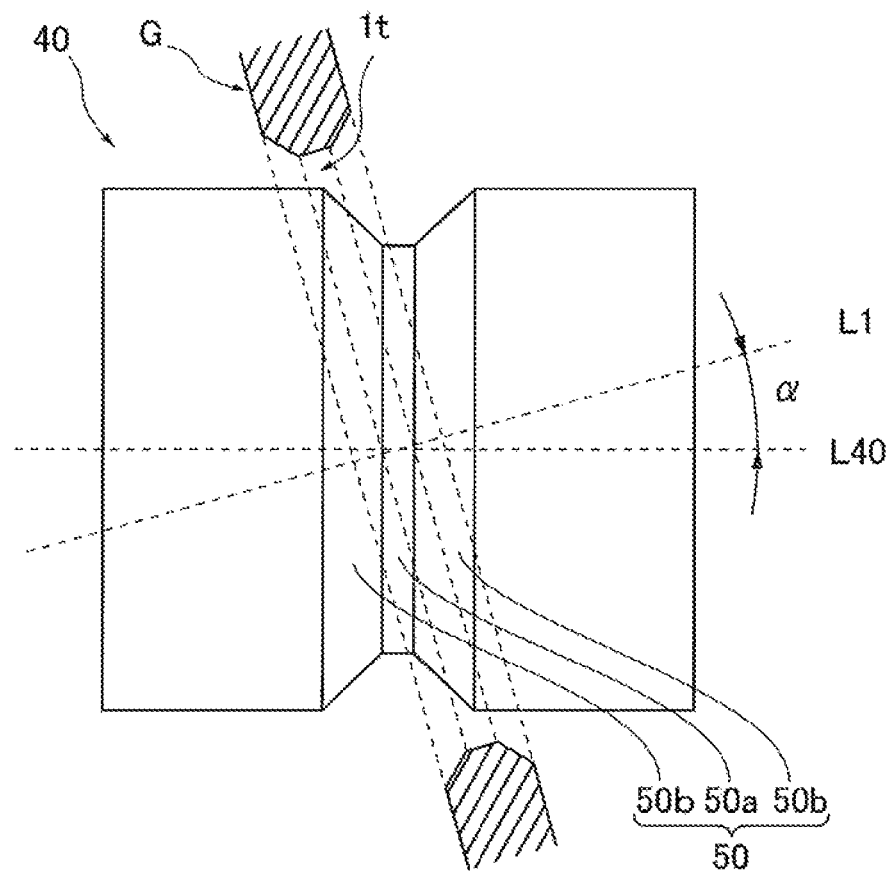
FIG. 7 is a diagram illustrating one example of grinding performed on an edge surface of the glass substrate of this embodiment.

Also, as for shape processing for forming the side wall surface 1t and the chamfered surfaces 1c of the glass substrate of the present embodiment, it is preferable to perform grinding that will be described below on the edge surface of the glass substrate to form the side wall surface 1t and the chamfered surfaces 1c. FIG. 7 is a diagram illustrating one example of grinding (this grinding is referred to as helical grinding hereinafter).

As shown in FIG. 7, a grinding grindstone 40 used in processing for grinding the edge surface of a glass substrate G is formed in a cylindrical shape overall and has a groove 50. The groove 50 is formed so as to be capable of simultaneously grinding both the side wall surface 1t and the chamfered surfaces 1c of the glass substrate G. Specifically, the groove 50 has a groove shape including a side wall portion 50a and chamfering portions 50b and 50b located on both sides of the side wall portion 50a. The side wall portion 50a and the chamfering portions 50b and 50b of the above-described groove 50 are formed so as to have predetermined dimensions and shapes in consideration of the finishing target dimensions and shapes of the ground surfaces of the glass substrate G.

In the shape processing for forming the edge surface of the glass substrate, the grinding processing is performed by rotating both the glass substrate G and the grinding grindstone 40 while bringing the grinding grindstone 40 into contact with the edge surface of the glass substrate G in a state in which the glass substrate G is inclined with respect to a circumferential direction in which the groove 50 formed in the grinding grindstone 40 extends, that is, in a state in which a rotation axis $L_1$ of the glass substrate G is inclined at an angle α (α is such that a counterclockwise angle is positive in FIG. 7) with respect to a rotation axis $L_{40}$ of the grindstone 40.

Although the inclination angle α of the glass substrate G with respect to the groove direction of the above-described grinding grindstone 40 can be set arbitrarily, in order to better obtain the above-described functional effect, the inclination angle α is preferably set in a range of 1 to 15 degrees, for example. It is preferable that the grinding grindstone 40 used in the grinding processing is a grindstone obtained by fixing diamond abrasive particles with resin (resin bond grindstone) or an electrodeposition grindstone obtained by fixing diamond abrasive particles with electrodeposition. It is preferable to use a 800# to 3000# diamond grindstone.

A preferable example of the circumferential speed of the grinding grindstone 40 is 500 to 3000 m/minute, and the circumferential speed of the glass substrate G is about 1 to 30 m/minute. In addition, it is preferable that the ratio (circumferential speed ratio) of the circumferential speed of the grinding grindstone 40 with respect to the circumferential speed of the glass substrate G is in a range of 50 to 300. Note that the above-described grinding step may be divided into two steps, and as described above, first grinding may be performed in a state in which the rotation axis of the glass substrate G is inclined at an angle α (α>0), second grinding may be performed in a state in which the rotation axis of the glass substrate G is inclined at only an angle −α using another grindstone, and adjustment may be performed such that the machining allowance of the second grinding is smaller than the machining allowance of the first grinding.

Note that in the shape processing, grinding with a formed grindstone is more preferably performed before helical grinding.

Method for Manufacturing Magnetic-Disk Glass Substrate

Next, a method for manufacturing a magnetic-disk glass substrate according to the present embodiment will be described. First, a glass blank, which serves as a raw material for a plate-shaped magnetic-disk glass substrate having a pair of main surfaces, is produced by press molding (press molding processing). Note that although the glass blank is produced by press molding in the present embodiment, a glass plate may be formed by a known float method, redraw method, or fusion method, and a glass blank having the same shape as that of the above-described glass blank may be cut out from the glass plate.

Next, a circular inner hole is created in a central portion of the produced glass blank, and a ring-shaped (annular) glass substrate is produced (circular hole formation processing). Next, shape processing for forming a chamfered surface is performed on the inner circumferential edge portion and the outer circumferential edge portion of the glass substrate in which the circular hole is formed (shape processing). Accordingly, the glass substrate with edge surfaces on which chamfered surfaces and the side wall surfaces are formed is obtained. Next, edge surface polishing is performed on the glass substrate that was subjected to shape processing (edge surface polishing processing). Grinding with fixed abrasive particles is performed on the glass substrate that was subjected to edge surface polishing (grinding processing). Next, first polishing is performed on main surfaces of the glass substrate (first polishing processing). Next, chemical strengthening is performed on the glass substrate as needed (chemical strengthening processing). Next, second polishing is performed on the glass substrate (second polishing processing). Thereafter, ultrasonic cleaning is performed on the glass substrate that has undergone the second polishing processing (ultrasonic cleaning processing). A magnetic-disk glass substrate can be obtained through the above-described processing. Hereinafter, each process will be described in detail.

Note that the magnetic-disk glass substrate that meets Requirements 1 and 2 in the present embodiment includes a glass substrate intermediate that serves as the blank for a magnetic-disk glass substrate (simply referred to as glass substrate intermediate hereinafter) that is the final product, after the above-described edge surface polishing processing and before the above-described second polishing (final polishing) processing, in addition to the magnetic-disk glass substrate that is the final product, which is manufactured using a method for manufacturing a magnetic-disk glass substrate and has undergone the above-described second polishing (final polishing) processing. The glass substrate intermediate is a glass substrate that was subjected to the edge surface polishing processing, and examples thereof include a glass substrate that has not undergone the above-described grinding processing, a glass substrate that has undergone the above-described grinding processing but has not undergone the above-described first polishing processing, and a glass substrate that has undergone the above-described grinding processing and the above-described first polishing processing, and has not undergone the above-described second polishing processing.

(a) Press Molding Processing

A disk-shaped glass blank is molded by cutting the tip of molten glass flow with a cutter, sandwiching the mass of the cut molten glass between press molding surfaces of a pair of metal molds, and pressing the mass. After pressing is performed for a predetermined time, the metal molds are opened to remove the glass blank.

(b) Circular Hole Formation Processing

A disk-shaped glass substrate having a circular hole can also be obtained by forming the circular inner hole on the glass blank with a drill or the like.

(c) Shape Processing

In the shape processing, chamfering processing is performed on an edge surface of the glass substrate that has undergone the circular hole formation processing. Chamfering is performed using a grinding grindstone, or the like. On the edge surface of the glass substrate, a side wall surface of the substrate that extends orthogonally to the main surfaces of the glass substrate and chamfered surfaces that are provided between this side wall surface and the main surfaces and extend with an inclination with respect to the side wall surface are formed by chamfering.

In the shape processing, the side wall surface and the chamfered surfaces may be formed by the above-described helical grinding. Furthermore, grinding with a formed grindstone may be performed before helical grinding.

(d) Edge Surface Polishing Processing

In the edge surface polishing processing, mirror finishing is performed on the outer circumferential side edge surface and the inner circumferential side edge surface of the glass substrate by edge surface polishing processing using the magnetic functional fluid as below. The magnetic functional fluid contains polishing abrasive particles in addition to the magnetic particles. Accordingly, a glass substrate that meets Requirement 1 and Requirement 2 can be obtained. That is, the edge surface is polished such that the edge surface of the glass substrate has a surface shape in which a roughness percentage is 40% or more when a bearing ratio of a roughness cross-sectional area is 50% in a bearing ratio curve of the roughness cross-sectional areas obtained when the surface roughness of the edge surface that was wet-etched by 2.5 μm is measured. In particular, it is preferable to perform edge surface polishing processing using magnetic functional fluid on the outer circumferential side edge surface of the glass substrate in light of the fact that corrosion is suppressed. Because the area of the outer circumferential side edge surface is larger than that of the inner circumferential side edge surface, and the outer circumferential side edge surface is exposed at the inner portion of a HDD (hard disk drive) into which the glass substrate is incorporated as a magnetic disk, for example, when corrosion occurs on the outer circumferential side edge surface, corrosion is likely to greatly affect the magnetic head.

The edge surface polishing processing using a magnetic slurry is performed with a method as described below, for example. FIGS. 8 to 11 are diagrams illustrating an example of the edge surface polishing processing in the present embodiment.

Figure 8:
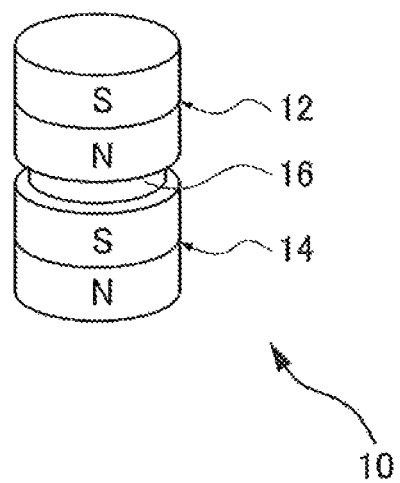
FIG. 8 is a diagram illustrating an example of edge surface polishing processing of this embodiment.
Figure 10:
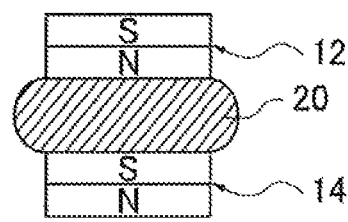
FIG. 10 is a diagram illustrating an example of edge surface polishing processing in this embodiment.
Figure 11:
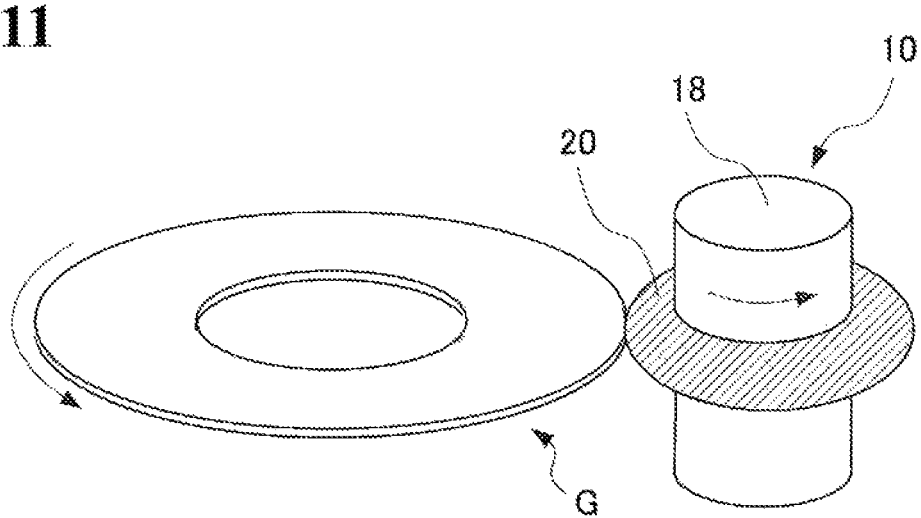
FIG. 11 is a diagram illustrating an example of edge surface polishing processing in this embodiment.

An apparatus 10 that performs edge surface polishing uses a means of generating magnetism and magnetic functional fluid containing magnetic particles and polishing abrasive particles to polish the edge surface of the glass substrate. To give a description of an overview of the apparatus 10 that performs edge surface polishing, as shown in FIG. 8, the apparatus 10 includes a pair of magnets 12 and 14, which are permanent magnets, and a spacer 16. In the apparatus 10, the spacer 16 is sandwiched between the magnets 12 and 14, and the apparatus 10 has a rotary shape that is long in one direction. The glass substrate on which edge surface polishing is performed is held by a holder (not shown). The apparatus 10 is disposed in the vicinity of the outer circumferential side edge surface of the glass substrate held by the holder, and a mass 20 (see FIGS. 10 and 11) of magnetic functional fluid and the outer circumferential side edge surface of the glass substrate are brought into contact with each other. The apparatus 10 and the holders (not shown) for holding the glass substrates are mechanically connected to a driving motor (not shown). As shown in FIG. 11, the apparatus 10 and the holder rotate due to the driving of the driving motor, and the outer circumferential side edge surface of the glass substrate and the mass 20 move relative to each other. Accordingly, the outer circumferential side edge surface of the glass substrate can be polished. The outer circumferential side edge surface of the glass substrate can be polished by rotating the apparatus 10 and the holder relative to each other at 500 to 2000 rpm, for example. Note that the outer circumferential side edge surface of the glass substrate and the mass 20 may be moved relative to each other by rotating only the glass substrate without rotating the apparatus 10. Although the apparatus 10 shown in FIG. 8 has a structure such that the spacer 16 is sandwiched between the magnets 12 and 14, the apparatus 10 may include an external member 18 (see FIG. 11) that covers this structure.

Furthermore, the apparatus 10 is allowed to pass through a circular hole provided in the center of the glass substrate, the inner circumferential side edge surface of the glass substrate may also be polished using the mass 20 provided on the outer circumference of the apparatus 10. Also, two apparatuses including a pair of magnets and a spacer may be disposed so as to polish the inner circumferential side edge surface and the outer circumferential side edge surface simultaneously.

Figure 9:
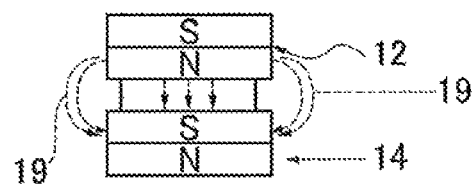
FIG. 9 is a diagram illustrating an example of edge surface polishing processing of this embodiment.

To give a more specific description of edge surface polishing processing using magnetic functional fluid, the magnet 12 and the magnet 14 come close to each other, function as the magnetism generation means, and form magnetic field lines 19 as shown in FIG. 9. These magnetic field lines 19 advance outwardly from the center of the magnets 12 and 14, and advance in the thickness direction of the glass substrate. The mass 20 of a magnetic slurry as shown in FIG. 10 is formed between the magnets 12 and 14 on the outer circumference of the apparatus 10. Note that although the mass 20 of the magnetic functional fluid protrudes outwardly from the outer circumferential surface of the magnets 12 and 14 so as to rise in FIG. 10, the mass 20 of the magnetic functional fluid need not protrude outwardly from the outer circumferential surface of the magnets 12 and 14.

Although the magnetic flux density in the magnetism generation means may be set to an extent that the mass 20 of the magnetic slurry is formed, the magnetic flux density is preferably 0.3 to 2 (tesla) in light of the fact that edge surface polishing is efficiently performed and the edge surface has the above-described surface shape.

Note that although permanent magnets are used as a magnetism generation means in the example shown in FIGS. 8 to 11, electromagnets may also be used. Also, it is also possible to ensure that the clearance between the N-pole edge surface of the magnet 12 and the S-pole edge surface of the magnet 14 is a certain distance by fixing the magnets 12 and 14 to an external member (not shown) without using the spacer 16.

In order that the edge surface meets Requirements 1 and 2 described above, magnetic functional fluid that contains nonpolar oil containing magnetic particles made of Fe in an amount of 3 to 5 g/cm$^3$, and surfactant, for example, is used as magnetic functional fluid used in edge surface polishing. The nonpolar oil or polar oil has a viscosity of 100 to 1000 (mPa·sec) at room temperature (20° C.), for example. The average particle size d50 (diameter) of magnetic particles is preferably 2 to 7 µm, for example.

When the magnetic functional fluid containing magnetic particles is formed as the mass 20 on the magnetic field lines, the mass 20 formed by the magnetic functional fluid includes polishing abrasive particles as well as magnetic particles. Because the polishing abrasive particles in the magnetic functional fluid are pushed into a portion having a low magnetic force gradient due to a magnetic levitation effect, the polishing abrasive particles are unevenly present in the vicinity of an edge surface of the glass substrate that is to be polished. Moreover, because the magnetic functional fluid forms a relatively highly elastic mass (hard mass) due to the magnetic field lines, polishing can be efficiently performed by the edge surface of the glass substrate being pressed against the mass 20. That is, the polishing rate can be increased and polishing can be efficiently performed.

Known polishing abrasive particles for a glass substrate, such as cerium oxide, colloidal silica, zirconia oxide, alumina abrasive particles, diamond abrasive particles, silica abrasive particles, or SiC abrasive particles, may be used as the polishing abrasive particles included in the magnetic functional fluid. The particle size of the polishing abrasive particles is 2 to 7 µm, for example. Use of polishing abrasive particles in this range makes it possible to efficiently perform the above-described edge surface polishing and favorably polish the inner circumferential side edge surface of the glass substrate. The magnetic slurry contains the polishing abrasive particles in an amount of 3 to 15 vol %, for example.

The magnetic functional fluid is a slurry obtained by including polishing abrasive particles in the magnetorheological fluid, for example. In this case, the viscosity of the magnetic functional fluid is preferably 1000 to 2000 (mPa·sec) at room temperature (20° C.) due to adjustment of the concentration of the magnetorheological fluid, in light of the fact that the mass 20 is formed and the edge surface polishing is efficiently performed. If the viscosity is low (if the concentration of the magnetorheological fluid is low), the mass 20 is unlikely to form, and it is difficult to perform polishing by relative movement in a state in which the mass 20 is pressed against the edge surface of the glass substrate 11. On the other hand, if the viscosity of the magnetic functional fluid is excessively high, the mass 20 will have a shape recessed along the shape of an edge portion of the glass substrate 11 during polishing, will be unlikely to be restored to its original state from this shape, and the shape of the glass substrate 11 will significantly remain on the mass 20. Thus, it will be difficult to form a state in which the mass 20 is evenly pressed against the edge surface. Also, the magnetic flux density in the magnetism generation means is preferably 0.3 to 2 (tesla) in light of the fact that the mass 20 is formed and edge surface polishing is efficiently performed.

When the above-described edge surface polishing is performed, the side wall surface and/or chamfered surfaces of the glass substrate can meet Requirement 1 and Requirement 2 by setting processing conditions as appropriate. The processing conditions include at least the viscosity of magnetic functional fluid, the types of magnetic particles and polishing abrasive particles, the particle size of polishing abrasive particles, the content of magnetic particles and polishing abrasive particles, the magnetic flux density of the magnets 12 and 14, a relative speed of the magnets 12 and 14 and the glass substrate G at a polishing position, and a force of the glass substrate G being pressed against the mass 20.

Note that use of the above-described helical grinding and polishing with magnetic functional fluid is preferable in light of the fact that the edge surface of the glass substrate G meet Requirements 1 and 2.

Also, the polishing amount (machining allowance) resulting from edge surface polishing is preferably a depth of 10 to 50 µm from the surface (20 to 100 µm in terms of the diameter of the glass substrate). If the polishing amount is less than 10 µm, there is a risk that grinding blemishes resulting from shape processing will not be sufficiently removed. Also, if the polishing amount is greater than 50 μm, there is a risk that the processing time will extend excessively and the productivity will deteriorate. Note that it is preferable that the depth from the surface is set to 20 μm (40 μm in terms of the diameter of the glass substrate) or more, because removal can be performed up to the depth of damage (latent blemishes) occurring in the inner portion of the substrate due to grinding processing. However, at this time, attention needs to be paid to the occurrence of new damages due to polishing processing.

(e) Grinding Processing

In the grinding processing, grinding processing is performed on the main surfaces of the glass substrate using a double-side grinding apparatus provided with a planetary gear mechanism. Specifically, both main surfaces of the glass substrate are ground while the outer circumferential side edge surface of the glass substrate is held in a holding hole provided in a holding member of the double-side grinding apparatus. The double-side grinding apparatus has a pair of upper and lower surface plates (an upper surface plate and a lower surface plate), and the glass substrate is sandwiched between the upper surface plate and the lower surface plate. The glass substrate and the surface plates are moved relative to each other by moving one or both of the upper surface plate and the lower surface plate while supplying coolant, and thereby both main surfaces of the glass substrate can be ground. For example, fixed abrasive particles obtained by fixing diamond with resin are formed into sheet to obtain a grinding member, the grinding member is mounted on the surface plates, and thereby grinding processing can be performed. Note that the order of the grinding processing and the above-described edge surface polishing processing may be switched.

(f) First Polishing Processing

Next, first polishing is performed on the ground main surfaces of the glass substrate. Specifically, both main surfaces of the glass substrate are polished while the outer circumferential side edge surface of the glass substrate is held in a holding hole provided in a carrier for polishing of a double-side polishing apparatus. First polishing is for removing blemishes and warping or adjusting minute unevenness (microwaviness, roughness) remaining on the main surfaces that have undergone the grinding processing.

In the first polishing processing, the glass substrate is polished using a double-side polishing apparatus having a configuration similar to that of the double-side grinding apparatus used in the above-described grinding processing with fixed abrasive particles, while a polishing slurry is provided. In the first polishing processing, a polishing slurry containing loose abrasive particles is used. Cerium oxide abrasive particles, zirconia abrasive particles, or the like, for example, are used as loose abrasive particles used in first polishing. Similarly to the double-side grinding apparatus, in the double-side polishing apparatus, the glass substrate is also sandwiched between the pair of upper and lower surface plates. Tabular polishing pads (resin polisher, for example) having an annular shape overall are attached to the upper surface of the lower surface plate and the bottom surface of the upper surface plate. The glass substrate and the polishing surface plates are moved relative to each other by moving one or both of the upper surface plate and the lower surface plate, and thereby both main surfaces of the glass substrate are polished. The size of the polishing abrasive particles is preferably in a range of 0.5 to 3 μm in terms of the average particle size (D50).

(g) Chemical Strengthening Processing

If the glass substrate is to be chemically strengthened, the glass substrate is immersed in a chemical strengthening liquid using a melt in which potassium nitrate and sodium sulfate are mixed, for example, as the chemical strengthening liquid. Accordingly, a compressive stress layer can be formed on the surface of the glass substrate by ion exchange.

(h) Second Polishing (Final Polishing) Processing

Next, second polishing is performed on the glass substrate. The second polishing processing is for mirror-polishing the main surfaces. In second polishing as well, a double-side polishing apparatus having a configuration similar to that of the double-side polishing apparatus used in first polishing is also used. Specifically, both main surfaces of the glass substrate are polished while the outer circumferential side edge surface of the glass substrate is held in a holding hole provided in a carrier for polishing of the double-side polishing apparatus. The second polishing processing differs from the first polishing processing in that the type and particle size of the loose abrasive particles are different, and the hardness of the resin polishers is different. The hardness of the resin polisher is preferably smaller than in the first polishing processing. For example, a polishing liquid containing colloidal silica as the loose abrasive particles is supplied between the polishing pads of the double-side polishing apparatus and the main surfaces of the glass substrate, and the main surfaces of the glass substrate are polished. The size of the polishing abrasive particles used in second polishing is preferably in a range of 5 to 50 nm in terms of the average particle size (D50).

It is sufficient to select whether or not to perform the chemical strengthening processing as appropriate, upon consideration of the glass composition and the necessity in the present embodiment. In addition to the first polishing processing and the second polishing processing, other polishing processing may be added, or two main surfaces may be polished in one instance of polishing processing. Also, the order of the above-described processes may be changed as appropriate.

In this manner, in the present embodiment, a decrease in the SN ratio of a reproduction signal can be suppressed by suppressing corrosion also under the flying condition that the flying height is reduced compared to the conventional flying height. That is, it is possible to meet the quality demand for the magnetic-disk glass substrate that is to be mounted in a hard disk drive together with a DFH head (a magnetic head provided with a DFH function). In particular, the glass substrate is suitable as a magnetic-disk glass substrate that is to be mounted on a hard disk drive together with a DFH head on which a HDI sensor is mounted and that is capable of controlling a protrusion amount of the recording and reproduction element based on a signal from the HDI sensor.

Note that when a glass substrate intermediate is manufactured as the above-described glass substrate, at least (h) second polishing (final polishing) processing among processes after (e) the above-described grinding processing onward is not performed. In this case, the method for manufacturing a glass substrate intermediate includes processing by which the glass substrate intermediate is produced by polishing edge surfaces of the glass substrate containing alkaline earth metal components as the glass composition. At this time in the edge surface processing, the edge surfaces of the glass substrate are polished such that a processed edge surface obtained by processing the glass substrate intermediate includes a surface having a roughness percentage of 40% or more when a bearing ratio of a roughness cross-sectional area is 50% in a bearing ratio curve of roughness cross-sectional areas obtained when the surface roughness of the processed edge surface after the edge surface is etched by 2.5 μm is measured.

Thereafter, for example, (e) the main surface grinding processing, and (f) the first polishing processing or (g) chemical strengthening processing are performed as needed.

In this manner, a glass substrate in a state after the edge surface polishing processing and before at least (h) second polishing (final polishing) processing is performed is referred to as "glass substrate intermediate".

Thus, after the glass substrate intermediate is produced, for example, when the glass substrate intermediate is transported to another place and a magnetic-disk glass substrate is manufactured, the magnetic-disk glass substrate that is the final product can be obtained by performing at least polishing processing (second polishing processing) on a main surface of the glass substrate intermediate. In this case, it is preferable to perform the grinding processing, the first polishing processing, or chemical strengthening processing on the main surfaces before the second polishing processing as needed.

Experimental Example 1

In order to study the effects of the glass substrate of the present embodiment, various types of edge surface polishing processing were performed on a side wall surface and chamfered surfaces of the glass substrate that had undergone shape processing and had Glass Composition 1. Note that the glass composition was adjusted so as to contain no alkali metal component and have a Tg of 700° C. or more.

Specifically, circular hole formation processing was performed on a disk-shaped glass blank obtained by a pressing method, and a disk-shaped glass substrate having a circular hole in the center portion was obtained. A glass composition that was used was Glass Composition 1 described above. Upper and lower main surfaces of this disk-shaped glass plate were subjected to the grinding processing using a double-side grinding apparatus including a pair of grinding surface plates, and the substrate thickness was adjusted to 0.7 mm. Thereafter, shape processing was performed on the edge surface of this disk-shaped glass plate such that the chamfering width was 0.15 mm and the chamfering angle was 45 degrees so as to obtain an inner circumferential side edge surface and an outer circumferential side edge surface, and then edge surface polishing processing was carried out. In the shape processing, first, a formed grindstone was used to perform rough processing by means of grinding processing without inclining the grindstone, the grindstone was changed, and finishing processing by means of helical grinding processing with an inclination of 3 degrees was performed.

Thereafter, various types of edge surface polishing processing were performed on the side wall surface and the chamfered surfaces of the glass substrate that had undergone the shape processing (described later). Note that processes other than the edge surface polishing processing were performed with the content of the above-described embodiment, and 200 magnetic-disk glass substrates were manufactured for each condition. However, chemical strengthening processing was not performed.

Specifically, as processes performed after the edge surface polishing processing,
Grinding processing on main surfaces using fixed abrasive particles
First polishing (performed using cerium oxide (d50: 1 μm) and hard polyurethane polishing pads),
Second polishing (performed using colloidal silica (d50: 30 nm) and soft polyurethane polishing pads), and
Cleaning processing were performed in the stated order, and thus the magnetic-disk glass substrates were manufactured. The manufactured magnetic-disk glass substrate is a nominal 2.5-inch magnetic-disk glass substrate having an outer diameter of approximately 65 mm, an inner diameter of approximately 20 mm, and a thickness of approximately 0.635 mm.

Note that the magnetic functional fluid that was used in the edge surface polishing processing was a magnetic slurry obtained by including magnetic particles containing polishing abrasive particles in magnetorheological fluid, and had a viscosity of 1000 (mPa·sec) at room temperature (20° C.).

Fe particles having an average particle size d50 of 2.0 μm were used as the magnetic particles, and zirconia particles having an average particle size d50 of 0.5 μm were used as the polishing abrasive particles.

In the edge surface polishing processing of Working Examples 1 to 8 and Comparative Example (Magnetic slurry polishing 1 to 9), the side wall surfaces and the chamfered surfaces of the glass substrates were polished with a method shown in FIG. 11, using magnetic functional fluid having the same composition.

In this polishing, the rotation axis of the glass substrate or the rotation axis of the magnets was caused to vibrate or fluctuate in directions in which the glass substrate and the magnets move toward each other or directions in which they are separated from each other, such that a force with which the glass substrate G is pressed against the mass 20 of the magnetic functional fluid slightly vibrates or slightly fluctuates. At that time, the frequency of the vibration or fluctuation was in a range of 1 to 50 Hz, the amplitude (half of the width of a change) was in a range of 0.2 to 2 mm, and the frequency and the amplitude were selected and used in combination as appropriate. Doing this makes it possible to cause vibration or fluctuation at a processing point where the glass substrate and the mass 20 come into contact with each other and the glass substrate is polished. Note that the rotation axes of both the glass substrate and the magnets may be caused to vibrate or fluctuate. The conditions were set based on the following tendencies as appropriate. That is, if the frequency of the vibration or fluctuation is increased, the roughness percentage tends to increase when the bearing ratio of the roughness cross-sectional area is 50%. Also, if the amplitude is increased, the roughness percentage tends to increase. It is inferred that the reason why the quality of a polished surface is improved by amplitude or fluctuation is because the strength of a magnetic field formed circularly is not necessarily uniform when viewed microscopically in a circumferential direction.

The polishing states of the side wall surface and the chamfered surfaces slightly change due to this magnetic functional fluid, which affects the formation of latent cracks on the edge surface of the glass substrate G.

Meanwhile, as Conventional Example 1, a side wall surface and chamfered surfaces of a glass substrate were polished using a polishing brush with a polishing slurry containing polishing abrasive particles that is the same type as used in the above-described magnetic functional fluid and that has the same average particle size d50, that is, zirconia particles having an average particle size d50 of 0.5 μm.

Moreover, as Conventional Example 2, a side wall surface and chamfered surfaces of a glass substrate were polished using a polishing brush with a polishing slurry containing ceria polishing abrasive particles having an average particle size d50 of 1.0 μm. Note that the manufacturing conditions of Conventional Examples 1 and 2 were the same as in Working Examples 1, except for edge surface polishing.

The polishing amount (machining allowance) for magnetic functional fluid polishing and brush polishing resulting from edge surface polishing was set to a depth of 20 μm from the surface (40 μm in terms of the diameter of the glass substrate) such that grinding blemishes resulting from shaping processing can be sufficiently removed.

After the surfaces of the edge surfaces were etched by 2.5 μm by immersing the edge surfaces (side wall surface and chamfered surfaces) of the glass substrates of Working Examples 1 to 8, Comparative Example, and Conventional Examples 1 and 2 that were obtained by this edge polishing processing in an etching liquid containing hydrofluoric acid, the surface shapes of the edge surfaces (side wall surface) of the glass substrates were measured. Furthermore, from these measurement results, a roughness percentage when the bearing ratio of the roughness cross-sectional area was 50% in the bearing ratio curve of the roughness cross-sectional areas was obtained. The results are shown in Table 1.

Incidentally, the edge surfaces of the magnetic-disk glass substrate that was obtained in Experimental Example 1 before the etching treatment, that is, the side wall surfaces and the chamfered surfaces on the outer circumferential side, which include the later-described edge surfaces of the magnetic-disk glass substrates that were obtained in this experimental example were all mirror surfaces. Also, the side wall surfaces and the chamfered surfaces on the inner circumferential side were similarly mirror surfaces. Also, with regard to the roughness of the edge surface, the arithmetic average roughness Ra was 0.015 μm or less, and Rz was 0.15 μm or less. Also, when the arithmetic average roughness Ra of a main flat surface of the glass substrate was measured with an atomic force microscope, and microwaviness (μWa) was measured with a scanning white-light interferometer, the arithmetic average roughnesses Ra of all the glass substrates were 0.15 nm or less, and the microwavinesses (μWa) of all the glass substrates for a magnetic recording medium were 0.15 nm or less.

Furthermore, after the magnetic-disk glass substrates (unused substrates on which the above-described etching treatment was not performed) of Working Examples 1 to 8, Comparative Example, and Conventional Examples 1 and 2 were left in an atmosphere having a temperature of 80° C. and a humidity of 85% for 48 hours, the occurrence of corrosion was observed and analyzed by surface observation with a SEM (scanning electron microscope) and component analysis with an EDS (energy dispersive X-ray spectrometry). Because a substance that attaches to the edge surface of the glass substrate and causes corrosion can be identified by its shape and components by the above-described observation and analysis, the occurrence of corrosion was evaluated by subjecting a region to which the identified substance attaches to surface observation with the above-described SEM, and surface blemishes were evaluated.

The occurrence of corrosion was evaluated by observing 10 fields of view of the side wall surface of the glass substrate at an observation magnification of 5000-fold using the SEM and counting locations at which foreign matter (corrosion) including alkaline earth metal elements of Mg, Ca, and Sr was observed in a field of view. The glass substrates were classified into levels as described below in accordance with the count. Levels 1 to 3 are acceptable and Levels 4 and 5 are not acceptable.

Level 1: no corrosion was observed
Level 2: corrosion was observed at one or two locations
Level 3: corrosion was observed at three or four locations
Level 4: corrosion was observed at five or six locations
Level 5: corrosion was observed at seven or more locations The results are shown in Table 1 below

TABLE 1

| | Edge surface polishing processing | Roughness percentage (%) | Evaluation of corrosion occurrence |
|---|---|---|---|
| Work. Ex. 1 | magnetic slurry polishing 1 | 40 | level 2 |
| Work. Ex. 2 | magnetic slurry polishing 2 | 43 | level 2 |
| Work. Ex. 3 | magnetic slurry polishing 3 | 47 | level 2 |
| Work. Ex. 4 | magnetic slurry polishing 4 | 50 | level 1 |
| Work. Ex. 5 | magnetic slurry polishing 5 | 55 | level 1 |
| Work. Ex. 6 | magnetic slurry polishing 6 | 60 | level 1 |
| Work. Ex. 7 | magnetic slurry polishing 7 | 63 | level 1 |
| Work. Ex. 8 | magnetic slurry polishing 8 | 68 | level 1 |
| Comp. Ex. | magnetic slurry polishing 9 | 33 | level 4 |
| Conv. Ex. 1 | polishing brush | 37 | level 5 |
| Conv. Ex. 2 | polishing brush | 28 | level 5 |

As is understood from the evaluation results of Table 1, it is understood that the edge surface has a surface shape in which the roughness percentage is 40% or more when a bearing ratio of a roughness cross-sectional area is 50% in the bearing ratio curve of the roughness cross-sectional areas of the edge surface that has undergone wet-etching, and thus the occurrence of corrosion is suppressed. Also, it is understood that when the roughness percentage is 50% or more, the occurrence of corrosion is further suppressed. Accordingly, the effects of the present embodiment are clear.

Also, in the working examples, if the roughness percentage when the bearing ratio of the roughness cross-sectional area is 50% was greater than 60%, very thin blemishes were observed on the outer circumferential side edge surface. It is inferred that those thin blemishes occurred due to scratching with the polishing carrier when the main surfaces that had undergone edge surface polishing were polished. That is, it is inferred that as a result of increasing vibration at a processing point in edge surface polishing processing, a difference in strength of the edge surface of the glass substrate abutting against the polishing carrier increases, and the proportion of a soft portion of the surface increased.

Also, in Working Examples 1 to 8, Comparative Example, and Conventional Examples 1 and 2, with regard to the glass substrate intermediates on which the grinding processing with fixed abrasive particles, the first polishing, and the second polishing after the edge surface polishing processing were not performed, the values of the roughness percentages of the edge surfaces after the etching processing were obtained and the occurrence of corrosion was evaluated using a laser microscope. In that case, evaluation results that were similar to those of Working Examples 1 to 8, Comparative Example, and Conventions Examples 1 and 2 were obtained.

Experimental Example 2

After various magnetic-disk glass substrates that were manufactured in Experimental Example 1 were subjected to annealing processing at 600° C., corrosion and surface blemishes were evaluated in a manner similar to that of Experimental Example 1. As a result, with regard to the corrosion evaluation, although annealing processing was performed, similarly to Table 1, it was found that corrosion was favorably suppressed in the working examples in which the surface shape of an edge surface that has a roughness percentage of 40% or more when the bearing ratio of the roughness cross-sectional area is 50% are included. Also, in the evaluation of surface blemishes, it was found that the occurrence of very thin blemishes was suppressed under the condition that the roughness percentage when the bearing ratio of the roughness cross-sectional area is 50% was 60% or less.

Experimental Example 3

A magnetic disk was manufactured by performing film formation processing on various magnetic-disk glass substrates (unused substrates) that were manufactured in Experimental Example 1, so as to provide an adherent layer, a soft magnetic layer, a nonmagnetic base layer, a vertical magnetic recording layer, a protecting layer, a lubricant layer, and the like, in addition to the above-described magnetic film. Note that annealing processing was also implemented at 600° C. after the formation of the magnetic film. When a long-term reliability test (continuous execution test of signal recording and reproduction) was performed using the obtained magnetic disk under the condition that the flying height of a recording and reproduction element portion of the DFH head was 1 nm, with the magnetic disk using the magnetic-disk glass substrate on which the edge surface polishing processing of working examples was performed, the phenomenon that the SN ratio of a reproduction signal decreased was not confirmed.

Experimental Example 4

Eight types of magnetic-disk glass substrates having edge surfaces with different surface shapes before etching processing were manufactured by appropriately adjusting the processing conditions of the shape processing and the edge surface polishing processing using the magnetic functional fluid based on the manufacturing conditions of Experimental Example 1 (Reference Examples 1 to 8). Note that the processing conditions of the edge surface polishing processing were adjusted by changing the average particle diameter d50 of polishing abrasive particles included in the magnetic functional fluid, the type of polishing abrasive particles, the conditions of vibration or fluctuation of the rotation axis in edge surface polishing using the magnetic functional fluid, and the like.

With regard to the obtained eight types of magnetic-disk glass substrates (that were not subjected to etching treatment), the following two points were executed.

The surface shape of the side wall surface was measured using a laser microscope under the above-described measurement conditions, and the bearing ratio of the roughness cross-sectional area at a roughness percentage of 60% was obtained.

Evaluation of the occurrence of corrosion that was the same as Experimental Example 1 was implemented using remaining substrates (unused) among multiple glass substrates of each type. The results are shown in Table 2 below. As is clear from Table 2, it is found that there is no correlational relationship between the occurrence of corrosion and the bearing ratio of the roughness cross-sectional area of the side wall surface of the glass substrate before the etching treatment, at a roughness percentage of 60%.

TABLE 2

| | Bearing ratio of roughness cross-sectional area (%) | Evaluation of occurrence of corrosion |
|---|---|---|
| Ref. Ex. 1 | 81 | level 1 |
| Ref. Ex. 2 | 84 | level 5 |
| Ref. Ex. 3 | 87 | level 2 |
| Ref. Ex. 4 | 90 | level 3 |
| Ref. Ex. 5 | 92 | level 1 |
| Ref. Ex. 6 | 95 | level 4 |
| Ref. Ex. 7 | 96 | level 1 |
| Ref. Ex. 8 | 97 | level 5 |

As described above, although a magnetic-disk glass substrate, a magnetic disk, a glass substrate intermediate, and a method for manufacturing a magnetic-disk glass substrate of the present invention have been described in detail, the present invention is not limited to the above-described embodiment, working examples, and the like, and it will be appreciated that various improvements and modifications can be made without departing from the gist of the present invention.

An aspect of the embodiment is a magnetic-disk glass substrate containing an alkaline earth metal component as a glass composition. This magnetic-disk glass substrate is a magnetic-disk glass substrate containing an alkaline earth metal component as the glass composition, in which an edge surface of the glass substrate is a mirror surface, and the edge surface includes a surface having a roughness percentage of 40% or more when a bearing ratio of a roughness cross-sectional area is 50% in a bearing ratio curve of roughness cross-sectional areas obtained when a surface roughness of the edge surface obtained after the edge surface is etched by 2.5 μm is measured.

It is preferable that the roughness percentage is 50% or more.

It is preferable that the roughness percentage is 60% or less.

It is preferable that an arithmetic average surface roughness of the mirror surface is 0.015 μm or less.

It is preferable that a glass transition point of glass that constitutes the magnetic-disk glass substrate is 700° C. or more.

It is preferable that the edge surface of the glass substrate includes a side wall surface and chamfered surfaces between a main surface of the glass substrate and the side wall surface, and the side wall surface is a surface having a roughness percentage of 40% or more.

It is preferable that glass that constitutes the magnetic-disk glass substrate is alkali-free glass.

It is preferable that the glass substrate is a magnetic-disk glass substrate that is to be mounted in a hard disk drive together with a magnetic head provided with a DFH (dynamic flying height) function.

It is preferable that the glass substrate is a glass substrate that is to be used in a magnetic disk for an energy-assisted magnetic recording method.

Also, another aspect of the embodiment is a magnetic disk in which a surface of the magnetic-disk glass substrate has at least a magnetic film.

Also, yet another aspect of the embodiment is a glass substrate intermediate containing an alkaline earth metal component as a glass composition and serving as a blank for a magnetic-disk glass substrate. In this glass substrate intermediate, an edge surface of the glass substrate intermediate is a mirror surface, and the edge surface includes a surface having a roughness percentage of 40% or more when a bearing ratio of a roughness cross-sectional area is 50% in a bearing ratio curve of roughness cross-sectional areas obtained when a surface roughness of the edge surface obtained after the edge surface is etched by 2.5 μm is measured.

It is preferable that the roughness percentage is 50% or more.

It is preferable that the roughness percentage is 60% or less.

It is preferable that glass that constitutes the glass substrate intermediate is alkali-free glass.

Moreover, still another aspect of the embodiment is a method for manufacturing a magnetic-disk glass substrate in which processing for polishing an edge surface of a glass substrate is performed. In the edge surface polishing processing in the manufacturing method, the edge surface is polished such that a roughness percentage is 40% or more when a bearing ratio of a roughness cross-sectional area is 50% in a bearing ratio curve of roughness cross-sectional areas obtained when a surface roughness of the edge surface obtained after the edge surface is etched by 2.5 μm is measured.

Still another aspect of the embodiment is a method for manufacturing a magnetic-disk glass substrate in which processing for polishing an edge surface of a glass substrate is performed. In this case, at least polishing processing is performed on a main surface of the glass substrate intermediate.

What is claimed is:

1. A magnetic-disk glass substrate containing an alkaline earth metal component as a glass composition, the magnetic-disk glass substrate comprising:
   a pair of main surfaces; and
      an outer circumferential side edge surface that is a mirror surface,
   the outer circumferential side edge surface including a surface having a roughness percentage of 40% or more and 68% or less when a bearing ratio of a roughness cross-sectional area is 50% in a bearing ratio curve of roughness cross-sectional areas obtained when a surface roughness of the outer circumferential side edge surface obtained after the outer circumferential side edge surface is etched by 2.5 μm is measured.

2. The magnetic-disk glass substrate according to claim 1, wherein
   the roughness percentage is 50% or more.

3. The magnetic-disk glass substrate according to claim 1, wherein
   the roughness percentage is 60% or less.

4. The magnetic-disk glass substrate according to claim 1, wherein
   an arithmetic average surface roughness of the mirror surface is 0.015 μm or less.

5. The magnetic-disk glass substrate according to claim 1, wherein
   a glass transition point of the glass composition that constitutes the magnetic-disk glass substrate is 600° C. or more.

6. The magnetic-disk glass substrate according to claim 1, wherein
   a glass transition point of the glass composition that constitutes the magnetic-disk glass substrate is 700° C. or more.

7. The magnetic-disk glass substrate according to claim 1, wherein
   the glass composition that constitutes the magnetic-disk glass substrate is alkali-free glass.

8. The magnetic-disk glass substrate according to claim 1, wherein
   an arithmetic average roughness Ra of the main surfaces of the magnetic-disk glass substrate is 0.15 nm or less.

9. A glass substrate intermediate containing an alkaline earth metal component as a glass composition and serving as a blank for a magnetic-disk glass substrate, the glass substrate intermediate comprising:
   a pair of main surfaces; and
   an outer circumferential side edge surface that is a mirror surface,
   the outer circumferential side edge surface includes a surface having a roughness percentage of 40% or more and 68% or less when a bearing ratio of a roughness cross-sectional area is 50% in a bearing ratio curve of roughness cross-sectional areas obtained when a surface roughness of the outer circumferential side edge surface obtained after the outer circumferential side edge surface is etched by 2.5 μm is measured.

10. The glass substrate intermediate according to claim 9, wherein
    the roughness percentage is 50% or more.

11. The glass substrate intermediate according to claim 9, wherein
    a glass transition point of the glass composition that constitutes the glass substrate intermediate is 700° C. or more.

12. The glass substrate intermediate according to claim 9, wherein
    the glass composition that constitutes the glass substrate intermediate is alkali-free glass.

13. The glass substrate intermediate according to claim 9, wherein
    an arithmetic average surface roughness of the mirror surface is 0.015 μm or less.

14. A method for manufacturing a magnetic-disk glass substrate, wherein
    at least polishing processing is performed on the main surfaces of the glass substrate intermediate according to claim 9.

15. A magnetic disk, wherein
    a surface of the magnetic-disk glass substrate according to claim 1 has at least a magnetic film.

16. A magnetic disk, wherein
    a surface of the magnetic-disk glass substrate according to claim 6 has at least a magnetic film.

17. A magnetic disk, wherein
    a surface of the magnetic-disk glass substrate according to claim 8 has at least a magnetic film.

18. A hard disk drive comprising:
    at least the magnetic disk according to claim 15.

19. A hard disk drive comprising:
    at least the magnetic disk according to claim 16.

20. A hard disk drive comprising:
    at least the magnetic disk according to claim 17.

* * * * *